United States Patent
Tebebi et al.

(10) Patent No.: US 10,151,405 B1
(45) Date of Patent: Dec. 11, 2018

(54) VALVE INTEGRATED PRESSURE REGULATOR WITH SHROUD AND DIGITAL DISPLAY FOR GAS CYLINDERS

(71) Applicants: Pamela Tebebi, East Amherst, NY (US); Paul K. Oetinger, Gasport, NY (US); Lloyd A. Brown, Amherst, NY (US); Giancarlo Nicolini, Villanuova Sul Clisi (IT)

(72) Inventors: Pamela Tebebi, East Amherst, NY (US); Paul K. Oetinger, Gasport, NY (US); Lloyd A. Brown, Amherst, NY (US); Giancarlo Nicolini, Villanuova Sul Clisi (IT)

(73) Assignee: PRAXAIR TECHNOLOGY, INC., Danbury, CT (US)

( * ) Notice: Subject to any disclaimer, the term of this patent is extended or adjusted under 35 U.S.C. 154(b) by 0 days.

(21) Appl. No.: 15/803,944

(22) Filed: Nov. 6, 2017

Related U.S. Application Data (63) Continuation-in-part of application No. 15/056,332, filed on Feb. 29, 2016, now Pat. No. 9,816,642, which is a continuation-in-part of application No. 14/987,840, filed on Jan. 5, 2016, now Pat. No. 9,599,285, which is a continuation of application No.
(Continued)

(51) Int. Cl.
*F16K 37/00* (2006.01)
*F17C 13/02* (2006.01)
*F17C 13/00* (2006.01)

(52) U.S. Cl.
CPC .......... *F16K 37/005* (2013.01); *F17C 13/002* (2013.01); *F17C 13/025* (2013.01); *F17C 2201/058* (2013.01); *F17C 2205/0308* (2013.01); *F17C 2205/0332* (2013.01); *F17C 2205/0388* (2013.01); *F17C 2250/032* (2013.01); *F17C 2250/034* (2013.01); *F17C 2250/036* (2013.01); *F17C 2250/043* (2013.01);
(Continued)

(58) Field of Classification Search
CPC .................. F17C 13/002; F17C 13/025; F17C 2205/0308; F16K 37/005
See application file for complete search history.

(56) References Cited

U.S. PATENT DOCUMENTS 5,001,685 A 3/1991 Hayakawa
5,196,781 A 3/1993 Jamieson et al.
(Continued)

FOREIGN PATENT DOCUMENTS

EP 1890213 2/2008
WO WO 2005/093377 10/2005

*Primary Examiner* — Craig Schneider
*Assistant Examiner* — Angelisa L Hicks
(74) *Attorney, Agent, or Firm* — Robert J. Hampsch (57) ABSTRACT

A valve integrated pressure regulator (VIPR) device is provided that includes a gas flow valve arrangement, a shroud and digital gauge display that can be attached or coupled to a gas cylinder, and which can monitor the amount or pressure of the gas in the gas cylinder. Features of the disclosed valve integrated pressure regulator device include an electronic control, electronic alarm and the electronic display that are powered by a battery that may be disposed within the shroud. The battery and/or electronic control are accessible via a removable access panel disposed on the front surface of the shroud.

7 Claims, 7 Drawing Sheets

Related U.S. Application Data

14/053,698, filed on Oct. 15, 2013, now Pat. No. 9,273,799.

(60) Provisional application No. 61/724,588, filed on Nov. 9, 2012.

(52) U.S. Cl.
CPC ............... *F17C 2250/0443* (2013.01); *F17C 2250/0491* (2013.01); *F17C 2270/02* (2013.01)

(56) References Cited

U.S. PATENT DOCUMENTS

| | | | |
|---|---|---|---|
| 5,409,037 | A | 4/1995 | Wheeler et al. |
| 5,482,405 | A | 1/1996 | Tolksdorf et al. |
| 6,137,417 | A | 10/2000 | McDermott |
| 6,820,647 | B1 | 11/2004 | Grecco et al. |
| 7,114,510 | B2 | 10/2006 | Peters et al. |
| 7,228,743 | B2 | 6/2007 | Weiss |
| 8,047,079 | B2 | 11/2011 | Bleys et al. |
| 8,291,904 | B2 | 10/2012 | Bathe et al. |
| 8,359,171 | B2 | 1/2013 | Bleys et al. |
| 2003/0189492 | A1 | 10/2003 | Harvie |
| 2004/0045608 | A1* | 3/2004 | Peters ..................... F16K 31/60 137/552.7 |
| 2006/0272710 | A1 | 12/2006 | Minervini et al. |
| 2007/0062585 | A1 | 3/2007 | Gamard et al. |
| 2007/0257498 | A1* | 11/2007 | Swain ................... F17C 13/002 294/27.1 |
| 2008/0110925 | A1 | 5/2008 | Hagstrom et al. |
| 2008/0150739 | A1 | 6/2008 | Gamard |
| 2009/0050218 | A1 | 2/2009 | Burgess et al. |
| 2009/0301581 | A1* | 12/2009 | MacNeal ................ F16K 1/306 137/505.14 |
| 2011/0088794 | A1 | 4/2011 | Cavagna |
| 2011/0309076 | A1* | 12/2011 | Liebenberg ........... F17C 13/025 220/203.01 |
| 2012/0080103 | A1 | 4/2012 | Levine et al. |
| 2012/0240927 | A1* | 9/2012 | Bathe .................... A61M 16/20 128/203.12 |
| 2013/0189492 | A1 | 7/2013 | Millward et al. |
| 2015/0260346 | A1* | 9/2015 | Ligonesche .............. F17C 1/00 206/0.6 |
| 2016/0265689 | A1* | 9/2016 | Sorensen .............. F16K 37/005 |

\* cited by examiner

FIG. 14

VALVE INTEGRATED PRESSURE REGULATOR WITH SHROUD AND DIGITAL DISPLAY FOR GAS CYLINDERS

CROSS REFERENCE TO RELATED APPLICATIONS

The present application is a continuation-in-part application and claims the benefit of and priority to U.S. patent application Ser. No. 15/056,332 filed on Feb. 29, 2016, which is a continuation-in-part application to U.S. patent application Ser. No. 14/987,840 filed on Jan. 5, 2016, now U.S. Pat. No. 9,599,285 issued Mar. 21, 2017, which claims priority from U.S. patent application Ser. No. 14/053,698 filed on Oct. 15, 2013, now U.S. Pat. No. 9,273,799 issued Mar. 1, 2016, which claims priority from U.S. Provisional Application Ser. No. 61/724,588, filed on Nov. 9, 2012. The above related applications are incorporated by reference herein.

FIELD OF THE INVENTION

The present invention relates to regulators for gas cylinders having protective shrouds, and more particularly to valve integrated pressure regulator (VIPR) devices with electronic displays and protective shrouds for such gas cylinders.

BACKGROUND

Gas cylinders are widely used in medical and industrial settings for the dispensing of gases and mixtures of gases such as oxygen, nitrogen, helium, nitrous oxide, heliox, nitric oxide, carbon monoxide, carbon dioxide, xenon, etc. While often cylinders included a visible means to indicate current cylinder contents with either mechanical or electronic manometers, the information is not transmitted to users as it relates to the current usage situation and often requires further processing of the information by the user to produce useful information. In the medical setting, the determination of time remaining relative to the current use rate of the gas cylinder is performed from tables and charts that are not always readily accessible leading to the non-continuous monitoring of patients and reduced patient safety. In industrial settings, cylinders are often used to provide calibration gases for critical process equipment where calibrations take extended periods of time with operators often stepping away to conduct other activities.

As valve integrated pressure regulator devices with electronic manometers and digital displays become more commonplace in medical and industrial settings, there is a need to make such devices more reliable, more ergonomic, and generally easier to use and maintain by the end-user. It is therefore an objective of the present invention to improve the maintainability, and availability of the valve integrated pressure regulator devices for the end-user and to make such valve integrated pressure regulator devices with digital displays generally easier to use. Such advantages are achieved by providing or designing a shroud that provides easy access to a removable battery and to the electronics associated with the digital display. The shroud with a removal access panel, described herein, facilitates removal and replacement of the battery and electronics associated with the digital or electronic display without complete disassembly of the shroud and without exposing the valve integrated pressure regulator to potentially damaging forces or events.

In addition, it is a further objective to improve the reliability of valve integrated pressure regulator devices with digital displays by eliminating one or more mechanical position sensors. By coupling the activation of the digital display of the valve integrated pressure regulator device with changes in the pressure within the gas cylinder, the use of mechanical position sensing switches can be avoided improving the reliability of such devices, as such mechanical switches tend to fail more frequently than the pressure sensors in the valve integrated pressure regulator. Such features improve the reliability, maintainability, and availability of the valve integrated pressure regulator devices for the end-user.

SUMMARY OF THE INVENTION

The present invention may be characterized as a shrouded valve integrated pressure regulator device for controlling the flow of a gas from a gas cylinder, comprising: comprising: (i) a gas flow passageway through the valve integrated pressure regulator device and having an inlet and an outlet, wherein the inlet is configured to be attached to the gas cylinder to receive the gas from the gas cylinder and the outlet is configured to be fluidically connected to a gas delivery device; (ii) a gas flow valve disposed in the gas flow passageway and configured to controllably open the passageway to permit flow of the gas therethrough and to controllably close the passageway to prevent flow of the gas therethrough; (iii) a shroud disposed around the gas flow valve and configured for protecting the gas flow valve against external damage; (iv) a manually operable selector operatively connected to the gas flow valve and accessible via an opening in the shroud, the manually operable selector configured to enable adjustment of the position of the gas flow valve to a closed position thereby preventing flow of the gas the gas flow passageway and one or more open positions thereby permitting flow of the gas through the gas flow passageway by movement of the manually operable selector; (v) a pressure sensor capable of ascertain the pressure of the gas in the gas cylinder when the valve integrated pressure regulator device is coupled to the gas cylinder; (vi) an electronic control configured to determine whether the device is in an active use state or a passive use state; (vi) an electronic display configured to display information in digital and/or analog form about the gas in the gas cylinder; and (vii) a battery source coupled to the electronic control and configured to provide power to the electronic control and to the electronic display via the electronic control. The shroud includes a removable access panel disposed on the front surface of the shroud that when removed exposes the battery source, or the electronic control, or both the battery source and the electronic control to facilitate removal or replacement of the battery source, or the electronic control, or both the battery source and the electronic control. The removable access panel further may include a sound port disposed on the exterior surface of the removable access panel through which any audible alarms are emitted.

An electronic alarm capable of being actuated to signify the presence of an alarm state audibly, visibly, or both audibly and visibly may be included or operatively associated with the valve integrated pressure regulator device. For embodiments having an electronic alarm, the electronic control is further configured to generate a signal actuating the electronic alarm when the valve integrated pressure regulator device is in an active use state and the amount of gas in the gas cylinder reaches the predetermined lower threshold. The electronic alarms are configured to be changed or altered when the valve integrated pressure regulator device is in the passive use state or may be deactivated by means of a manually operated switch. Also, during such passive-use states, the valve integrated pressure regulator device operates in a lower power mode in order to conserve power and prolong the battery life. Power from the battery source is provided to the electronic control and electronic display, but at a reduced level compared to the power charge supplied during an active-use state.

In some embodiments, the shroud may further comprise an upper portion having a handle, a body portion having a generally annular outer surface and the removable access panel. The removable access panel preferably has a flat exterior surface that is oblique relative to the generally annular outer surface to facilitate easy removal. When the removable access panel is detached from the shroud, the gas flow valve in the valve integrated pressure regulator is set to the closed position. The electronic control may also be mechanically attached to the removable access panel and operatively coupled to the battery source via a first electronic connector and/or wires and operatively coupled to the electronic display via a second electronic connector.

BRIEF DESCRIPTION OF THE DRAWINGS

While the specification concludes with claims distinctly pointing out the subject matter that applicants regard as their invention, it is believed that the invention will be better understood when taken in connection with the accompanying drawings in which:

DETAILED DESCRIPTION

Figure 1:
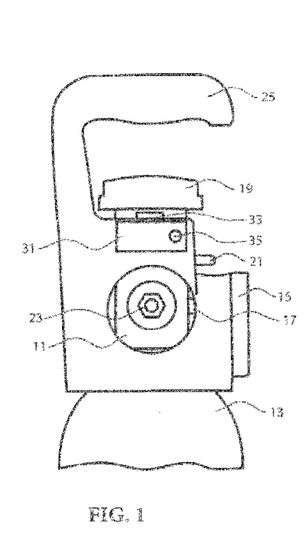
FIG. 1 is a side plan view of the left side of an embodiment of a valve integrated pressure regulator device, as attached to the top of a gas cylinder, together with a shroud that encloses the valve integrated pressure regulator device.
Figure 3:
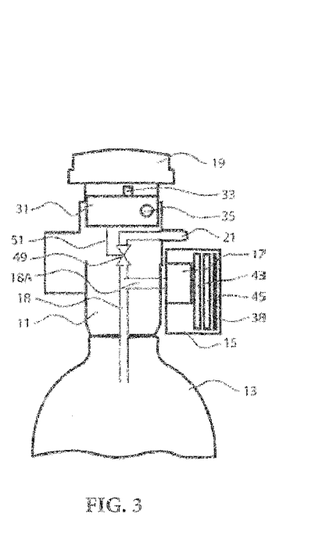
FIG. 3 is a cross-sectional view of the embodiment and view of the valve integrated pressure regulator device of FIG. 1, without the shroud.

Turning to FIG. 1, there is shown device 11 which is an embodiment of a valve integrated pressure regulator device, connected to a gas container such as a conventional gas cylinder 13. Device 11 when in use is attached to cylinder 13 to create a seal that does not permit gas to pass through the connection, such as by being threaded into a mating threaded opening in cylinder 13. Device 11 includes electronic manometer 15 which includes pressure sensor component 17 as described below (FIG. 3). Tube 18A connects pressure sensor component 17 to the interior of cylinder 13, as seen in FIG. 3.

Single-knob selector 19 attached to device 11 permits the control of gas release from the cylinder 13 through the device to outlet 21, by the user selecting a desired flow rate and turning selector 19 to a position that corresponds to the desired flow rate. Selector 19 also has a position at which flow of gas through and out of device 11 is closed off. Preferably, selector 19 is rotatable about a vertical axis. The cylinder can be filled with gas to be dispensed through a valve at fill port 23 that can be controllably opened and closed.

Surrounding device 11 and attached thereto is optional cap 25, preferably comprising a protective shroud integral with a handle that can be easily gripped by the user to carry the cylinder 13 while also protecting the device 11 against damage in the event the cylinder is dropped or falls over. Cap 25 can be manufactured of metal or sturdy plastic. Cap 25 can be of any ergonomic or aesthetic configuration which is useful in marketing of the associated equipment while also being sufficient to protect the components of the device 11.

An electronic control 31 is either permanently affixed to the device 11 or the protective shroud or cap 25. Alternatively, the electronic control may be detachable from the device or the protective shroud. The electronic control 31 comprises electronic controls that receive, store, process and generate signals as described further herein. Electronic control 31 preferably includes a mechanical interface, including switch 33, to indicate to the electronic control for the device the position of the selector 19 (and thus whether the device is closed to flow of gas or open for flow of gas, as described hereinbelow). Preferably, device 11 also contains a manually operable input device, such as button 35, to allow a user to interact with the device's activation of an alarm as described further hereinbelow.

Figure 2:
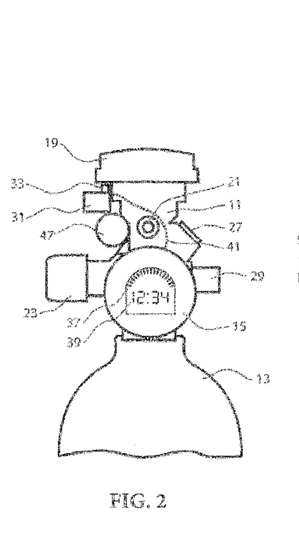
FIG. 2 is a front plan view of the embodiment shown in FIG. 1 of the valve integrated pressure regulator device, without the shroud.

Turning to FIG. 2, there is shown the embodiment of FIG. 1 in which cylinder 13 has been turned a quarter of a circle, so that electronic manometer 15 is seen from its front rather than from its side as seen in FIG. 1. In addition, in FIG. 2 the protective cap 25 seen in FIG. 1 has been removed to permit better viewing of components in the device 11. The valve fill port 23 is covered by a cap in this view. In the view of FIG. 2, outlet 21 is seen as well as pressure relief safety valve 27 and optional auxiliary outlet 29, both of which are normally closed. The view of FIG. 2 also shows the device 11 attached to the gas cylinder 13. Electronic manometer 15 preferably includes display 38 having indicia on its face enabling electronic display of information in one or both of graphical format 37 and/or numerical format 39. Electronic manometer 15 is connected to electronic control 31 by cable 41 to allow information to pass between these two components. Selector 19 and 33 are also visible, as is battery 47 which provides electrical power to the electronic controls by appropriate connections.

Turning to FIG. 3, the gas path and additional components of device 11 can be seen directly in the cross sectional view. In this view, the protective cap 25 seen in FIG. 1 has been removed to better illustrate the connectivity of different elements in the device. The electronic manometer 15 houses a data processing unit 43, a data transmitting unit 45, and the electronic display 38. The data processing unit 43, a data transmitting unit 45, or the electronic display 38 can be combined in any combination useful to carrying out the methods described herein. The electronic manometer 15 is shown including pressure sensor component 17 that is attached, for example threaded into, leg 18A of tube 18. Tube 18 is open to the gas in cylinder 13. Leg 18A of tube 18 is attached to pressure sensor component 17 so that pressure sensor component 17 is exposed to the gas at its pressure within cylinder 13.

Device 11 also includes a valve or valve system, represented as 49 in FIG. 3, which controls whether or not gas can flow through tube 18 to outlet 21. That is, valve 49 can be closed to gas flow or can be open to one or more open positions permitting gas to flow. Valve 49 is connected to selector 19, preferably by a valve stem represented as 51 in FIG. 3 or equivalent connection, so that movement of selector 19 moves valve 49 between a closed position and one or more open positions.

Figure 4:
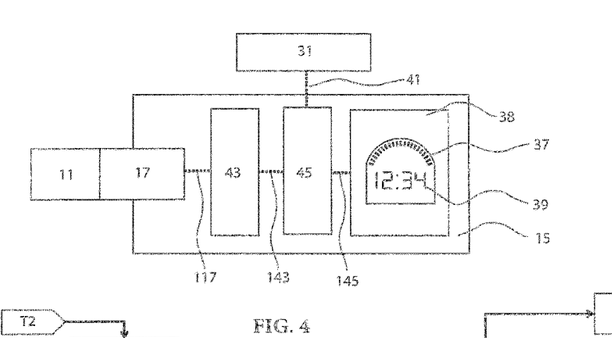
FIG. 4 is a schematic view of components of an embodiment of the valve integrated pressure regulator device showing their relative connections to one another.

FIG. 4 illustrates schematically the components of the electronic manometer 15 along with the manner in which other components of the valve integrated pressure regulator device can be operatively interconnected. The electronic manometer 15 includes pressure sensor component 17 that is attached to device 11 as described above. Pressure sensor component 17 is connected via suitable electrical connection 117 to a data processing unit 43 which is in turn connected via suitable electrical connection 143 to a data transmitting unit 45. The data transmitting unit 45 can pass a signal (information) electrically through cable 41 to the electronic control 31 and/or through suitable electrical connection 45 to display 38, such as on the face of electronic manometer 15, where it can indicate either graphical information 37 or numerical information 39, or both. Any useful information can be displayed, such as: the pressure of gas in the cylinder, the amount of gas remaining in the cylinder, the time remaining until the amount of gas remaining in the cylinder is low enough to reach a predetermined threshold value (or to be completely exhausted from the cylinder), the status (including alarm status) of the cylinder, or other desired information about the status of the unit. The format of the display can take the form of a symbol that comes on or flashes, an analog scale (like the gas gauge in an automobile) and/or a digital display, or other formats. The display can be activated so that different items of information appear together, or alternatingly (i.e. with one item appearing, then a second item, then the first again, and so on).

In the embodiment illustrated in FIG. 1 and FIG. 2 and FIG. 3 and FIG. 4, the user selects an operating flow rate by moving the single-knob selector 19 to a position which opens valve 49 to permit gas to flow out of the cylinder through the device 11. The position to which the selector 19 is moved engages switch 33 which engagement is recognized by the electronic control 31. The electronic control 31 then transmits a signal to the data transmitting unit 45, which signal is transferred to the data processing unit 43 within the electronic manometer 15, that the user has initiated gas flow by opening valve 49 of the device 11. The electronic manometer including pressure sensor component 17 detects the pressure of gas in the cylinder, converts that detected pressure to an electronic signal corresponding to the detected pressure, and passes that signal to the data processing unit 43.

Figure 7:
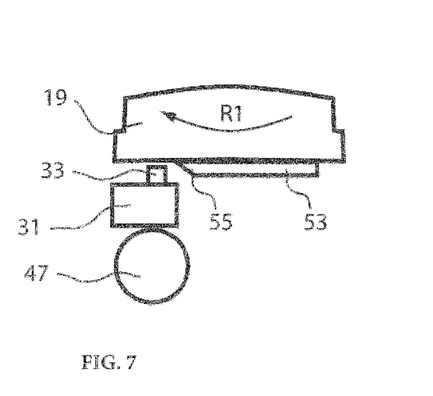
FIG. 7 is an enlarged front plan view of the top portion of an embodiment of a valve integrated pressure regulator device, showing the valve integrated pressure regulator device in the "off" position.
Figure 8:
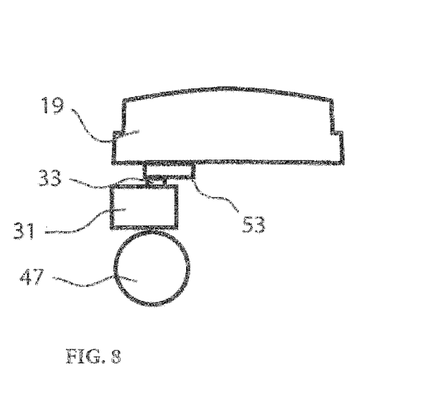
FIG. 8 is an enlarged front plan view of the embodiment of FIG. 7, showing the valve integrated pressure regulator device in the "on" position.

Turning to FIG. 7 and FIG. 8, a preferred mode of the operation of selector 19 is shown where rotation of selector 19 can be sensed via switch 33. In this embodiment, selector 19 includes depending projection 53 having a tapered shoulder 55. Rotation of selector 19 in direction R1 causes shoulder 55 and projection 53 to engage switch 33, which is activated by being pressed downward in this case.

Figure 9:
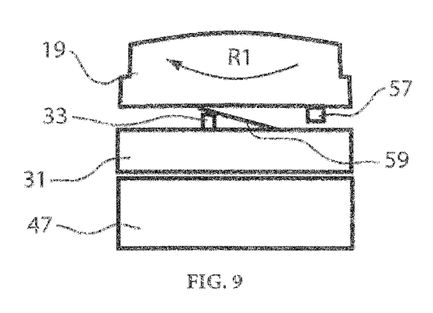
FIG. 9 is an enlarged front plan view of the top portion of another embodiment of the valve integrated pressure regulator device, showing the valve integrated pressure regulator device in the "off" position.
Figure 10:
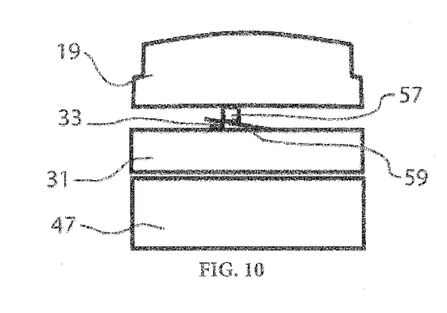
FIG. 10 is an enlarged front plan view of the embodiment of FIG. 9, showing the valve integrated pressure regulator device in the "on" position.

FIG. 9 and FIG. 10 show an alternative embodiment for activation of switch 33 by selector 19, in which rotation of selector in direction R1 causes a projection 57 under selector 19 to engage leaf spring 59 affixed to device 11, and leaf spring 59 is urged downward to depress switch 33 and thereby activate or close switch 33. The switch can be selected such the system is enabled to sense that the single-knob selector 19 has been turned to allow flow of gas, or refined such that the degree of rotation of the single-knob selector 19 can be determined. In either case, the rotation of the selector 19 is such that it can: move off the switch, move onto the switch, open switch contacts, close switch contacts, or any combination therein of.

Data processing unit 43 conducts a calculation of time remaining, or other user specific information, to then be passed back to the data transmitting unit 45. For instance, "time remaining" means the interval of time remaining, calculated based on the flow rate of the gas from the cylinder that corresponds to the flow rate setting of the selector 19 and the detected pressure in the cylinder, until the amount of gas remaining in the cylinder has reached a threshold value at which the user should be notified that only a limited amount of time remains before the cylinder's contents of the gas will have been exhausted. Thus, the valve integrated pressure regulator device operates not on the basis of a preset limiting pressure, but on the basis of a preset time threshold which in turn is a function of the flow rate of the gas. That is, the present device and method do not depend on pre-established reference pressure values. In this way, greater operational flexibility and adaptability are provided, in being able to accommodate a variety of pressures and flow rates and the changing of the pressure within the cylinder as the contents pass out of the cylinder.

Based on the type of user specific information passed to the data transmitting unit 45, the device then gives an indication of the device's use state to the user by any one or more of the following: displaying graphical information 37 on the electronic display 38; displaying alpha-numerical information 39 on the electronic display 38; or passing a signal to an alarm.

The device's electronic control is preprogrammed to receive pressure readings from the electronic manometer 15 at preprogrammed intervals of time and to compute, based on the pressure readings and on the preprogrammed flow rate that corresponds to the position setting of the selector that is detected by the electronic control via switch 33, the time remaining until exhaustion of gas from the cylinder. Alternatively, it could compute the time remaining until the time remaining to complete exhaustion has reached a preset value. In one exemplary embodiment, pressure readings are received once a minute (by taking one reading per minute, or by taking several readings within one second at points one minute apart and averaging those readings) and the change in pressure over the one-minute period is used together with the detected or preprogrammed flow rate to determine a new time remaining value. The gas pressure within the cylinder can be measured more often, such as every second, for e.g. purposes of displaying this information, without necessarily computing time-remaining values on pressure readings detected that often.

The electronic control generates signals that can be communicated to a display which desires the desired information such as time remaining and/or pressure. Preferably, the display is integral with the device and electrically connected to the other components, but it should be appreciated that the display signal(s) representing information to be displayed can be transmitted to a display that is remote from the device 11, by wire or wirelessly, such as to a receiver carried by a remote user or health care professional.

The device's electronic control is preprogrammed to generate an alarm signal that is capable of actuating an alarm when an alarm state has been attained. The preferred alarm state is that the amount of time remaining in which gas can flow from the cylinder before the gas is exhausted from the cylinder, first reaches or first passes lower than a certain preprogrammed threshold value. The electronic control determines a time remaining value as described herein, and when that value has reached the threshold value then an alarm signal is actuated.

The device 11 preferably also includes one or more components, also referred to as alarms, that when actuated call the user's attention to the state of the cylinder or the state of the gas supply in the cylinder. One such state is that the amount of gas remaining in the cylinder has been depleted to an amount such that only a short period of time remains before the gas will be completely exhausted from the cylinder. Suitable alarms include a component the electronic control 31 or elsewhere on device 11 and electrically connected to the alarm that emits an audible sound (whether continuously or intermittently repeating, i.e. beeping); a component that causes a visible sign, such as a light that comes on or flashes intermittently (such as a white or colored light-emitting diode on display 38, or elsewhere on the device), or causing electronic display 38 to blink, or an additional symbol appearing or flashing on the display 38. It should also be recognized that the alarm signal can be transmitted to an alarm that is remote from the device 11, by wire or wirelessly, such as to a receiver carried by a remote user or health care professional.

Preferably, device 11 also includes controls by which a user can manually deactivate an alarm that has been actuated, whereupon the electronic control continues to detect the pressure of gas in the cylinder and continues to compute time remaining values, and when the electronic control determines that the time remaining value first equals or is lower than a second predetermined threshold value, the alarm signal is again actuated. For instance, an alarm signal could be generated the first time when the time remaining is 30 minutes, and a second time when the time remaining reaches 15 minutes. The alarm that is actuated this second time can be the same as the first alarm, or it can be different—for instance, different in type (i.e. audible versus visible), and/or different in degree (e.g. continuous sound in place of intermittent sounds, or louder). The device 11 can optionally further include controls that enable a user to deactuate a second alarm signal, whereupon the electronic control actuates an alarm signal a third time upon the time remaining value attaining a third preprogrammed value.

Figure 5:
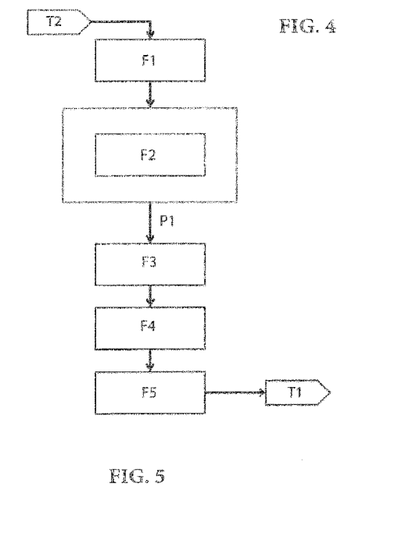
FIG. 5 is a schematic view or flow chart of operations that can be carried out by a user of an embodiment of a valve integrated pressure regulator device when the device is operatively attached to a container following exhaustion of gas from the gas cylinder, to replenish the supply of gas in the gas cylinder.
Figure 6:
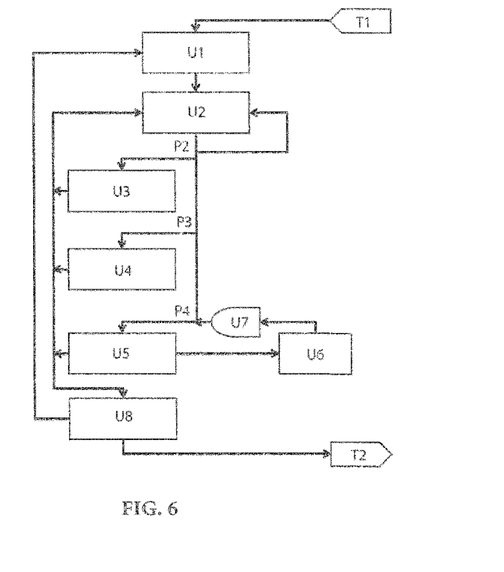
FIG. 6 is a schematic view or flow chart of operations that can be carried out by a user when the valve integrated pressure regulator device is operatively attached to a gas cylinder.

Turning to FIG. 5 and FIG. 6, the manufacturer and user task flow paths (respectively) for use of a valve integrated pressure regulator device are shown as a network of interconnected paths. FIG. 5 shows the path consisting of operations F1, F2, F3, F4, and F5 that the manufacturer or gas supplier or re-filler may take with the device. FIG. 6 shows the various paths of user actions (U1 through U8) expected to be conducted with the device during the administering of gases. The electronic logic of the data processing unit 43 acts to coordinate the flow of information between the different elements of the device as well as determine the next information to be displayed for user actions.

Transport of the device from the user's facility to the manufacturer T2 is carried out with the device in a passive use state. As the process map in FIG. 5 shows, the device is then prepared for filling the cylinder, step F1, through the fill port 23 by connection to the filling system (not pictured) by plant operators. To avoid unnecessary audible alarms the operators carry out step F2 wherein the electronic control 31 and single-knob selector 19 are used in a specified combination to send signals to the data transmission unit 45, which are interpreted by the data processing unit 43, to inactivate any audible alarm for the cylinder filling operations, P1. This process allows the device state to go from an active use state into a passive use state. The filling operators then empty the cylinder, F3. On refilling the cylinder to the use pressure, the alarm is reactivated, F4, when the data processing unit 43 determines the device is in a cylinder recharging state, by a rise in cylinder pressure above a predetermined threshold. Once the cylinder is filled, a final device check and inspection can be performed, F5, before the device is transported back to a user facility, T1.

Transport of the filled cylinder from the manufacturer to the user's facility, T1, is carried out with the device in a passive use state. Users begin administration of the cylinder contents to a patient, step U1, through a rotation of the single-knob selector 19 which is detected, and is interpreted by the data processing unit 43 as that the device has entered an active use state. The data processing unit 43 uses the position of the selector 19 (identified for instance by switch 33) and periodic pressure measurements obtained from the pressure sensor component 17 to carry out a calculation of user specific information to generate display signal(s) and transmission of information to the user, step U2. The calculation can be simply the conversion of voltage or electrical current to pressure units, more complex calculations using time based data to identify the remaining time before the cylinder's contents become exhausted, or comparisons of input or calculated information to pre-programmed threshold limits. Calculations of remaining time require the additional information of a lower threshold limit.

Threshold values, including lower threshold limits, are fixed pre-programmed values based on the regional, customer or cylinder gas requirements. The data processing unit 43 carries out comparisons of the current device state, including selector position, pressure readings, and/or time remaining, to other intermediate limits (P2, P3, or P4) at which time the device enters a different operating state, such as an alert or alarm state, based on attaining preprogrammed intermediate limit requirements.

Intermediate limits P2 and P3 put the system into similar but independent alert states with U3 corresponding to a lower priority state than U4. If a higher threshold limit P4 is reached, the device enters an active alarm state represented by U5. All alert or alarm states include updating the transmitted user information for generating and actuating signals for display and for issuing of auditory and visual indications. Alert and alarm states can be distinguished by different visual indications on the electronic display 38 or different audible indications by the electronic control 31.

General monitoring of the device for user actions is carried out in all states to either sense the (i) inactivation of the device through a rotation of the single-knob selector to a position indicating that the valve is closed, step U8; or (ii) signal the device to enter a passive use state, input P3, via the electronic control 31 resulting in the device removing the audible indication of alarm. If any limit threshold limit fails to be reached, the device remains in the current active use state while updating the transmitted user information to the electronic manometer 15 for display and actively monitors for a change in state, step U2. During the passive use state, the data processing unit 43 causes the display 38 to display user specific information gathered from the pressure sensing component 17 to update the alpha-numerical information 39.

The present device and digital gauge display could be tailored for use for on standard compressed gas cylinders or on sub-atmospheric delivery systems such that authorized users are aware of pressure conditions within the cylinder prior to connection and operation of the device. The present device could be configured to automatically shut down when such conditions are not proper.

Removable Access Panel on Shroud

The disclosed valve integrated pressure regulator device preferably includes a protective cap or shroud. In some embodiments, the protective cap or shroud is equipped with an integrated battery case for easy swapping out of batteries or to store a spare battery pack. In such contemplated arrangement, the batteries and electronic components for powering the digital gauge are directly designed into the shroud packaging and preferably use standard battery sizes. A storage compartment with a removable access panel in the shroud handle or shroud body would house the batteries with the associated digital gauge electronics and associated electrical connections. Such arrangement represents an improvement over prior art shrouded valve integrated pressure regulator devices in that access to the electronics and any battery in such prior art shrouded valve integrated pressure regulator devices would require removal and/or disassembly of the entire shroud. Use of a removable access panel in the shroud handle or shroud body reduces the time required to replace batteries or to replace/retrofit the device electronics.

Figure 11:
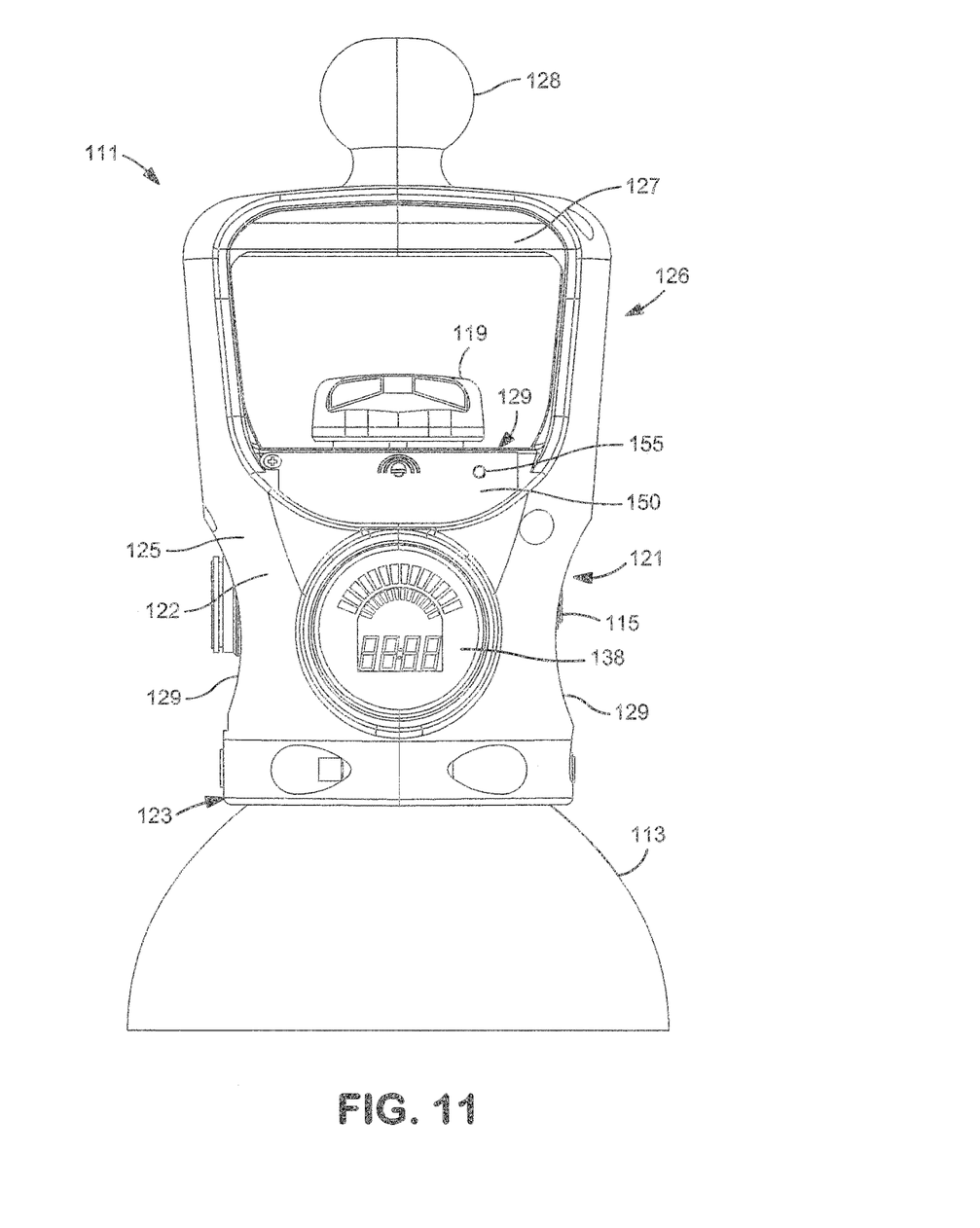
FIG. 11 is a front view of a valve integrated pressure regulator device having a shroud and digital gauge with a removable access panel in accordance with the present invention.
Figure 12:
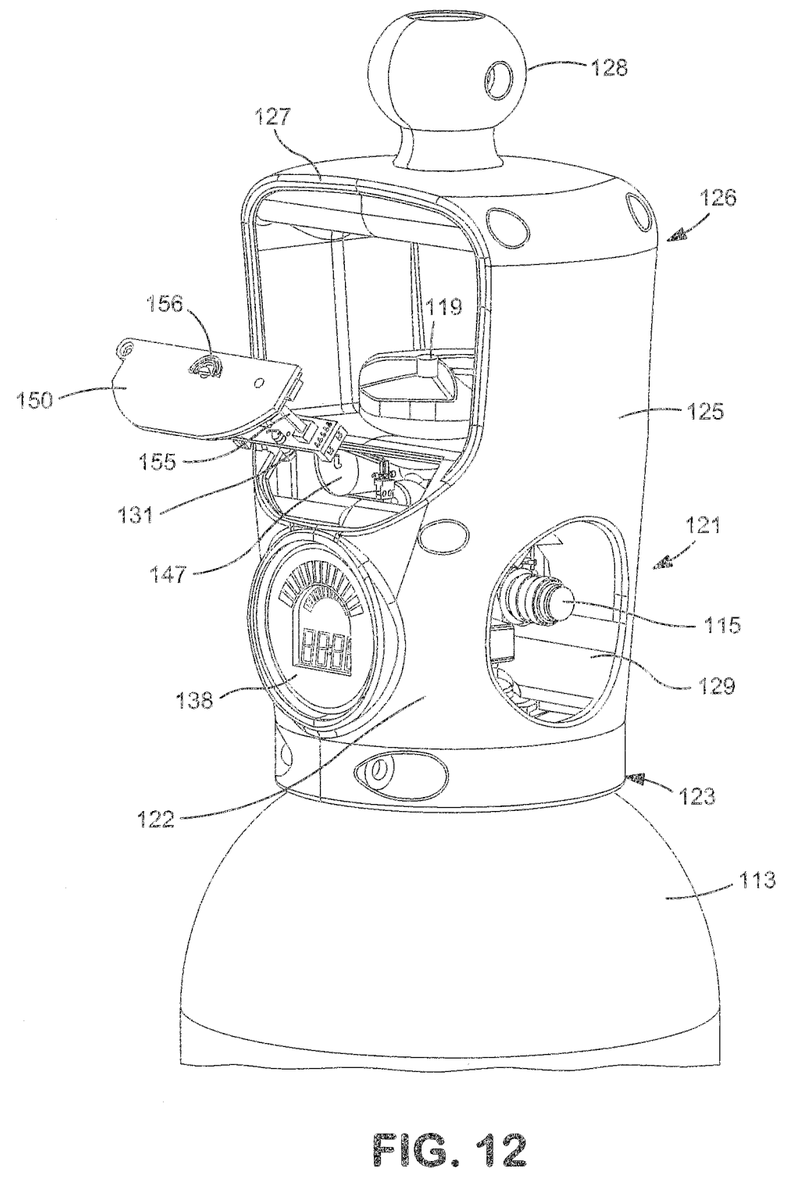
FIG. 12 is a partially exploded perspective view of the valve integrated pressure regulator device of FIG. 11 showing the access to the replaceable battery and electronic control that is operatively associated with the digital gauge.

Turning to FIG. 11 and FIG. 12, there is shown a shrouded valve integrated pressure regulator device 111 with an electronic display (e.g. digital gauge display) 138 and a removable access panel 150 that provides easy access to a replaceable battery 147 and electronic control 131 that are operatively associated with the electronic display 138. The shrouded valve integrated pressure regulator device 111 is disposed on a gas cylinder 113 and comprises a gas flow valve arrangement, a manually operable selector 119, one or more gas inlets/outlets; a shroud 125, a pressure sensor, an electronic control 131, an electronic display 138, and a battery source 147.

The gas flow valve arrangement of the valve integrated pressure regulator device 111 preferably includes a gas flow passageway having an inlet and at least one outlet 115. The inlet is configured to be coupled or attached to the gas cylinder 113 to receive a flow of gas from the gas cylinder 113 while the at least one outlet 115 is configured to be fluidically connected to a gas delivery device (not shown) or other point of use for the gas. A gas flow valve is disposed in the gas flow passageway and configured to controllably open the passageway to permit flow of the gas from the gas cylinder 113 through the gas flow valve arrangement to the outlet 115 and to controllably close the gas flow passageway to prevent flow of the gas from the gas cylinder 113 through the gas flow valve arrangement. Opening and closing the gas flow valve is accomplished through the use of a manually operable selector 119 accessible via an opening in the shroud 125. The manually operable selector 119 operatively controls the gas flow valve by setting the valve to a first closed position preventing flow of the gas from the gas cylinder 113 through the gas flow passageway or by setting the gas flow valve to one of several open positions thereby permitting flow of the gas from the gas cylinder 113 through the gas flow passageway.

The electronics associated with the present valve integrated pressure regulator device 111 include an electronic control 131, an electronic display 138, and a battery source 147 for providing power to the electronic control 131 and electronic display 138. In the present embodiment, the electronic control 131 is preferably configured to determine whether the valve integrated pressure regulator device 111 is in an active use state or a passive use state. The electronic display 138 is operatively coupled to the electronic control 131 and configured to display the sensed pressure and/or information in digital and/or analog form about the gas in the gas cylinder 113 only when the device is in an active use state. The present valve integrated pressure regulator device 111 may further include an electronic alarm 145 coupled to the electronic control 131 and capable of being actuated to signify the presence of an alarm state audibly and/or visibly. The battery source 147 is preferably coupled to the electronic control 131 as well as to the electronic display 138 and electronic alarm 145 via the electronic control 131.

The illustrated shroud 125 is a two or more piece structure disposed around the gas flow valve arrangement and is configured for protecting the gas flow valve arrangement against externally imparted damage or debris. The shroud 125 preferably includes an upper portion 126 having a handle 127 and optionally a knob 128, wherein the handle 127 and knob 128 facilitate grasping the gas cylinder 113 to lift, rotate, move or otherwise transport the gas cylinder 113. The shroud 125 also includes a body portion 121 having a generally annular outer surface 122 and a distal end collar portion 123 extending downward from the body portion 121 and past the shrouded gas flow valve arrangement. The distal end collar portion 123 is configured to shield or cover the connection or joint between the gas cylinder 113 and the valve integrated pressure regulator device 111. The shroud 125 further includes a plurality of openings 129 through which the inlet, outlet 115, manually operable selector 119 and the electronic display 138 are accessible. The shroud 125 further includes a removable access panel 150 that is disposed proximate the front surface of the shroud and is detachable from the shroud 125. For sake of clarity, the front surface of the shroud is a surface on the front of the shroud which is defined as the part of the shroud that includes electronic display. When the removable access panel 150 is removed or separated from the shroud 125, the battery source 147 and/or the electronic control 131 are exposed to facilitate removal or replacement of the battery source 147, or the electronic control 131, or both the battery source 147 and the electronic control 131.

Figure 13:
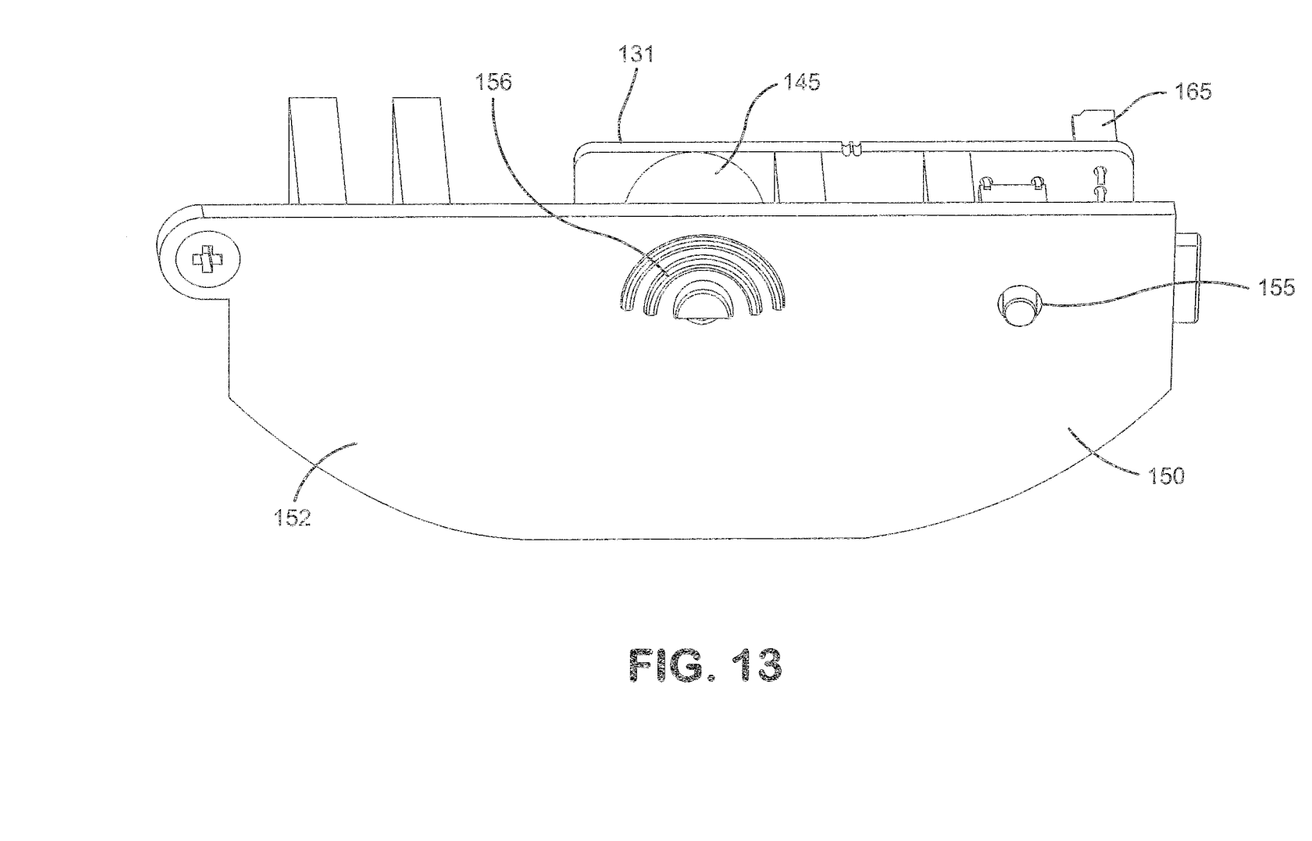
FIG. 13 is a front perspective view of the removable access panel of FIG. 11 and FIG. 12 with the electronic control that is operatively associated with the digital gauge.
Figure 14:
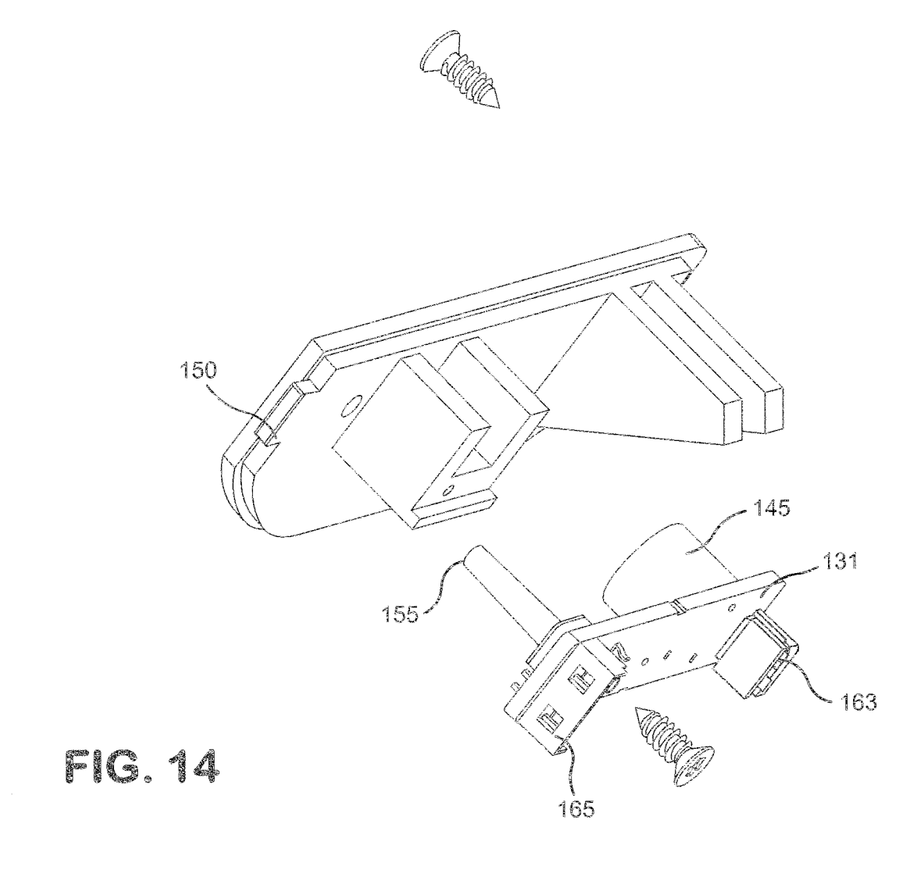
FIG. 14 is an exploded rear perspective view of the removable access panel of FIG. 11 and FIG. 12 with the electronic control.

The removable access panel 150 is shown in more detail in FIG. 13 and FIG. 14. As seen therein, the illustrated removable access panel includes a screw used as a means for attaching or removing the removable access panel 150 from the shroud 125. In the illustrated embodiment, the electronic control 131 with an electronic alarm 145 is mechanically attached to the back of the removable access panel 150 and operatively coupled to the battery source 147 via a first electronic connector 163 and/or wires. Likewise, the electronic control 131 is also operatively coupled to the electronic display 138 via a second electronic connector 165.

The removable access panel preferably has a front flat exterior surface 152 that is arranged in an oblique orientation relative to the generally annular outer surface 122 of the body portion 121 of the shroud 125 making replacement of the battery source 147 and/or electronic control 131 an ergonomically easier task given the compactness of the valve integrated pressure regulator device 111. The illustrated removable access panel 150 also includes a manually operable switch 155 and optionally one or more alarm indicators such as a speaker 156 to project audible alarms or a light (not shown) to project visual alarms. The manually operable switch 155 is configured for temporarily deactivating, disabling or muting the electronic alarm 145. The manually operable switch 155 and one or more alarm indicators are preferably disposed on the front flat exterior surface 152 of the removable access panel 150 and operatively connected to the electronic control 131. In some embodiments, when the removable access panel 150 is detached from the shroud 125, the gas flow valve must be set or is automatically set to the closed position. Although not shown, the removable access panel may also include a battery charging port in applications where the battery is a rechargeable battery.

Active-Use State and Passive-Use State

In the present embodiment of the valve integrated pressure regulator device, the electronic control is configured to determine whether the device is in an active use state or a passive use state. As described above, the active-use state includes most normal operating modes of the valve integrated pressure regulator device when a gas is flowing from the gas cylinder through the valve integrated pressure regulator device to the outlet or suitably connected gas delivery device. It may also include operating modes where the gas from the gas cylinder is being intentionally vented. During such active-use states, the valve integrated pressure regulator device operates in a higher power mode and fully illuminating the electronic display and capable of actuating all alarms.

The passive-use state, on the other hand, includes modes when the gas flow valve is in the closed position such as during storage and transport of the gas cylinder as well as when the gas cylinder is empty. The passive-use state may also include operating modes such cylinder filling operations. During such passive-use states, the valve integrated pressure regulator device operates in a lower power mode in order to conserve power and prolong the battery life. Power from the battery source is provided to the electronic control and electronic display, but at a reduced level compared to the power charge supplied during an active-use state.

During the passive-use state, the electronic control continues to operate on an intermittent basis so as to determine whether the device has entered an active-use state. Such intermittent operation during the passive-use state reduce the power consumed by the valve integrated pressure regulator device extends the useful life of the battery. Also, during the passive-use state, the electronic control may also ascertain whether selected alarm conditions exist and activate the appropriate alarms, either audibly or visually. Examples of alarms or sensors that may be activated during passive-use states include leak detection alarms, environmental monitoring, location detection, cylinder/device damage alarms, etc.

In some embodiments, the present electronic control and electronic display of the valve integrated pressure regulator device could be programmed or configured to detect that the correct vacuum levels has been achieved in each gas cylinder during the cylinder filling process, or other passive-use state, and actuate an alarm. Such functionality would represent an improvement on the current cylinder filling process which uses a common manifold pressure sensor to detect the correct vacuum level across a plurality of cylinders. For example, activation of a visual alarm such as a colored light or backlight to visually indicate the cylinder is either empty, has attained the correct vacuum level, or the correct cylinder fill pressure during a passive use state such as the cylinder fill process would be beneficial. Such passive-state alarm integrated into a gas cylinder fill process would represent a significant productivity improvement as the technician can simply glance at the plurality of cylinders to confirm completion of the vacuum step, rinse step, or fill step during the cylinder fill process. Different colored lights may also be used for different conditions such as: red when the gas cylinder is empty; blue when the correct vacuum level is attained during the fill process; and green when the cylinder is at the correct fill pressure.

As indicated above, when the valve integrated pressure regulator device is in an active use state, the electronic control is preferably configured to calculate as a function of the detected position setting and the ascertained pressure of the gas in the gas cylinder, the interval of time remaining until the amount of gas in the gas cylinder will reach a predetermined lower threshold and the electronic display is configured to display the interval of time remaining until the amount of gas in the gas cylinder will reach such predetermined lower threshold. The electronic control is further configured to generate a signal actuating the electronic alarm when the amount of gas in the gas cylinder reaches the predetermined lower threshold or when the gas cylinder is empty.

Additional Design Features

Additional design features may be incorporated into the valve integrated pressure regulator device. For example, a battery charging port, connection or wireless charging arrangement may also be integrated into the protective cap or shroud such that the battery may be recharged concurrently with the gas cylinder being refilled or even when the cylinder is in active use state. Alternatively, the gas cylinder may include a removable cylinder base disposed proximate the bottom of the cylinder that includes an integrated battery case providing the battery power for the device as well as spare battery pack storage. The associated wiring and connections from the battery power source in the cylinder base to the device would be house within the cylinder or via a conduit disposed on the exterior surface of the cylinder. A battery charging lead or connection may also be integrated into the cylinder base such that the battery may be recharged during storage, transport or use of the gas cylinder or even when the gas cylinder is being refilled.

In lieu of or in addition to battery power, some embodiments of the disclosed device may be powered from an alternate source such as solar or light sources in a manner similar to that disclosed in U.S. Pat. Nos. 7,228,743 and 5,196,781. In some other contemplated embodiments, the device may also include an integrated charging feature that powers the device or recharges the battery based on movement of gas cylinder or the flow of gas through the valve much like methods for charging electronic wristwatches (see for example, U.S. Pat. No. 5,001,685).

The disclosed valve integrated pressure regulator device may also be fitted with additional sensors such as a chemical sensor, a temperature sensor, light sensor, accelerometer, magnetic field sensing, etc. to provide additional functionality for the device. A device incorporating a chemical sensor would be useful to detect impurities or presence of toxic gases and/or to assure the proper gas composition is delivered from the cylinder during use, particularly medical gas uses. For example, an electronic display (i.e. digital gauge) containing valve integrated pressure regulator device with a built-in chemical sensor may be used to determine if gas product being supplied from the cylinder meets the required quality targets prior to dispensing. This is of critical importance in situations where toxic gases such as carbon monoxide, nitrogen dioxide may be present.

Other sensors that could be incorporated within the disclosed device may include the capability to sense proximity to a magnetic field of a given strength or the ability to detect temperature excursions outside of specific window and disable the valve integrated pressure regulator device or emit an alarm if such temperature excursions or presence of magnetic fields pose a safety hazard.

Another sensor suitable for integrating into the electronic display (i.e. digital gauge) containing valve integrated pressure regulator device would include an accelerometer to monitor and/or assure proper handling of the gas cylinder and disable the valve integrated pressure regulator device or emit an alarm if the cylinder had been dropped or excessively mishandled during transport.

Yet another sensor or detecting means that is suitable for integrating into the digital gauge containing valve integrated pressure regulator device is one that monitors the leak integrity of the gas cylinder when it is in a passive use state. The leak detecting sensor would further send a signal that alerts the user or other nearby persons that a leak is present within the gas cylinder system. Such sensors may be atmosphere monitoring sensors, chemical sensors, and/or pressure sensing techniques. This leak detecting sensors or means are particularly useful in gas cylinder based systems involving flammable and/or toxic gases.

Still other features and functionalities may be integrated within the disclosed electronic display (i.e. digital gauge) containing valve integrated pressure regulator device. Of particular importance would be the ability to transmit and/or receive data to and/or from different sources. For example, a global positioning system or GPS type chip may be integrated within the device to provide functionality regarding location or inventory tracking of the gas cylinders. In addition, electronic transmission of the cylinder location, cylinder contents, and/or cylinder condition to a data storage or central processing unit is contemplated for purposes of safety, inventory tracking, usage tracking (e.g. time of use and flow rates), billing, cylinder replacement planning, and other administrative or logistical functions. In medical gas cylinder applications, such communications would preferably be compliant or example with ISO/IEEE 11073-30300, "Health informatics—Point-of-care medical device communication—Part 30300, et seq. Such wireless communications incorporated within the device would preferably be configured with power saving features, so as to minimize power usage and preserve battery life.

As briefly described above, certain embodiments of the present device for controlling gas flow from a gas cylinder or container preferable incorporate wireless or hard-wired communication features and, in particular, a data receiving capability which would allow use of externally supplied data to assist in the control of gas delivery from the gas cylinder. For example, in medical gas applications, the supply of supplemental oxygen and other medical gases is often monitored by select patient indicators such as saturated blood level, heart rate and blood pressure, etc. The ability to receive such external data and display such patient indicators on the electronic display of the present device may reduce the monitoring equipment required at the patient bedside or during patient transport. Use of the external data to adjust the gas delivery could improve the quality of patient care, in ways similar to those described, for example, in U.S. Pat. Nos. 8,359,171 and 8,291,904 as well as United States Patent Application Publication No. 2003-0189492.

Advantageously, wireless or hard wired communications can enable still further functionality of the present digital gauge. Battery recharging can be accomplished in applications where the gas cylinder with the present device is operatively connected either physically or wirelessly to an auxiliary delivery and monitoring device. Also, hard-wired connectors between the electronics or gas circuitry within the present device and a downstream delivery device may be customized so as to ensure a specific type or brand of auxiliary device is coupled to the gas cylinder equipped with the present device. This feature is particularly advantageous where the gas cylinder and the auxiliary device are sold or commercialized as a package or bundle. Custom connections or interlock mechanisms may be employed to compel or ensure the desired bundling of products. Similarly, custom communication protocols may be employed to compel or ensure the desired bundling of products.

Wireless or hard wired communications can also be part of the security features of the present device. For example, operation of the device may be authorized through the use of RFID fobs, barcode scanning, or chip technology to identify an authorized user of the gas cylinder and device. The device may also incorporate anti-tampering features to identify situations where an unauthorized use of the device and release of the cylinder contents is attempted.

An alternative security feature or convenience feature that is contemplated for some embodiments of the present device, it to make a portion of the device, namely the digital gauge and electronic display, a removable component that may be quickly attached to the device and/or removed from the device via some form of a quick connect fitting. In such arrangements, an authorized user would be required to insert or affix a digital gauge and electronic display into the device or shroud that would then be electronically coupled to the device and enable the use or operation of the device and initiate the delivery of gases from the cylinder. Such arrangements would effectively allow tracking of which persons are operating the devices.

While the present invention has been described with reference to a preferred embodiments and features as well as operating methods associated therewith, it is understood that numerous additions, changes and omissions to the disclosed systems and methods can be made without departing from the spirit and scope of the present invention as set forth in the appended claims.

What is claimed is:

1. A shrouded valve integrated pressure regulator device for controlling the flow of a gas from a gas cylinder, comprising:
   a gas flow passageway through the valve integrated pressure regulator device and having an inlet and an outlet, wherein the inlet is configured to be attached to the gas cylinder to receive the gas from the gas cylinder and the outlet is configured to be fluidically connected to a gas delivery device;
   a gas flow valve disposed in the gas flow passageway and configured to controllably open the passageway to permit flow of the gas therethrough and to controllably close the passageway to prevent flow of the gas therethrough;
   a manually operable selector operatively connected to the gas flow valve and accessible via an opening in the shroud, the manually operable selector configured to enable adjustment of the position of the gas flow valve to a closed position thereby preventing flow of the gas the gas flow passageway and one or more open positions thereby permitting flow of the gas through the gas flow passageway by movement of the manually operable selector;
   a pressure sensor capable of ascertaining the pressure of the gas in the gas cylinder when the valve integrated pressure regulator device is coupled to the gas cylinder;
   an electronic control configured to determine whether the valve integrated pressure regulator device is in an active use state or a passive use state;
   an electronic display configured to display information in digital and/or analog form about the gas in the gas cylinder when the device is in an active use state;
   a battery source coupled to the electronic control and configured to provide power to the electronic control and to the electronic display via the electronic control; and
   a shroud disposed around the gas flow valve and configured for protecting the gas flow valve against external damage, wherein the shroud includes a removable access panel disposed on a front surface of the shroud that is detachable from the shroud and that when removed exposes the battery source and/or the electronic control to facilitate removal or replacement of the battery source, or the electronic control, or both the battery source and the electronic control;
   an electronic alarm coupled to the electronic control and capable of being actuated to signify the presence of an alarm state audibly, visibly, or both audibly and visibly;
   a manually operable switch disposed on the removable access panel and operatively connected to the electronic control, the manually operable switch configured for temporarily deactivating an electronic alarm.

2. The shrouded valve integrated pressure regulator device of claim 1 wherein the shroud further comprises an upper portion having a handle, a body portion having a generally annular outer surface, the front surface and the removable access panel that is disposed on the front surface.

3. The shrouded valve integrated pressure regulator device of claim 1 wherein the removable access panel has a flat exterior surface that is oblique relative to the generally annular outer surface.

4. The shrouded valve integrated pressure regulator device of claim 1 wherein the valve integrated pressure regulator device is configured such that when the removable access panel is detached from the shroud, the gas flow valve is set to the closed position.

5. The shrouded valve integrated pressure regulator device of claim 1 wherein the electronic control is mechanically attached to the removable access panel and operatively coupled via a first electronic connector and/or wires to the battery source.

6. The shrouded valve integrated pressure regulator device of claim 1 wherein the electronic control is mechanically attached to the removable access panel and operatively coupled to the electronic display via a second electronic connector.

7. The shrouded valve integrated pressure regulator device of claim 1 wherein removable access panel further comprises a sound port disposed on an exterior surface of the removable access panel through which audible alarms are emitted.

* * * * *